Patented Feb. 10, 1931

1,791,990

UNITED STATES PATENT OFFICE

WILLIAM WHITEHEAD, OF CUMBERLAND, MARYLAND, ASSIGNOR TO THE CELANESE CORPORATION OF AMERICA, A CORPORATION OF DELAWARE

EXTRACTION OF DYESTUFFS

No Drawing.   Application filed October 24, 1925.   Serial No. 64,575.

It has been well known that artificial fibres, films and the like, may be bleached by chemical processes. In these bleaching processes the dyestuffs themselves are destroyed and the fibres, films, or the like are changed physically and chemically to such an extent that their dyeing properties are altered and that the luster, strength, or elasticity may be impaired.

This invention comprises a process for the extraction of dyestuffs from artificial fibres, films, and the like, which is a physical process and results in a separation of the dyestuffs and fibres without changing them either chemically or physically. Thereafter the dyestuffs may be used for future dyeing and the fibres, films and the like may be used either without further change or they may be redyed or if desired they may be redissolved and used for the production of new fibres, films, or for other purposes.

While the invention is applicable particularly to artificial fibres, films and the like, made from cellulose ethers and cellulose esters, and more especially to such products formed from cellulose acetate, it may be applied to other types of artificial fibres, films and the like. Also, notwithstanding the fact that it is particularly adapted for sulphoricinoleic acid dyestuffs, it may be used in connection with other dyestuffs such as are insoluble in water but soluble in organic solvents and usually applied from an aqueous dispersion.

The invention herein claimed is a specific example of the invention disclosed in my copending application Serial No. 64,574, filed October 24, 1925, and in said other case it has been pointed out that a large number of different substances or solutions may be used for this purpose. The only essential feature is that the solution shall be a swelling agent for the fibres, films or the like and a solvent for the dyestuffs. Some substances have both qualities, while in other cases it is necessary to mix two substances in the solution since only one may be a swelling agent for the dyestuffs or only one may be a solvent for the dyes.

Some substances will extract the dyestuffs by treatment of the material therewith in the cold. In other cases, the material and solution must be heated in order to obtain the most advantageous results. The temperature may vary somewhat according to the boiling point of the solvent employed, but will usually be from about 54° to 72° C.

The solutions which are capable of removing the dyestuffs in the cold are much more powerful swelling agents for the fibres, films, and the like, and much greater care is therefore necessary to prevent disintegration or physical alterations thereof. When the treatment is carried out with solutions which need to be heated, the dyestuffs will be extracted with properties substantially unchanged and the fibres or other artificial cellulosic material will be unaltered as regards chemical and physical properties.

The length of time of the treatment will vary and it has been found that successive treatments of about ten minutes with fresh solutions are more advantageous. The successive treatments may be carried out at gradually increasing temperatures. The particular mechanical means for carrying out the process is immaterial and any suitable apparatus may be employed for the mechanical agitation of the cellulosic material and the extracting solutions.

The group of substances which it is desired to claim in this application includes the chlorine derivatives of unsaturated hydrocarbons. Of this group there may be specified dichlorethylene, $C_2H_2Cl_2$; trichlorethylene, $C_2HCl_3$; perchlorethylene, $C_2Cl_4$, and the like. Of these the preferable substance appears to be trichlorethylene.

If cellulose acetate yarn dyed by S. R. A. methods and with S. R. A dyestuffs is mixed with trichlorethylene in the cold, no dyestuffs are extracted. If the mixture is heated, the yarn swells gently and without any tendency to disintegrate, and the dyestuffs in the yarn enter into solution with the trichlorethylene. It is preferable to repeat the treatment a few times with fresh hot solutions and thereby all of the dyestuffs may be removed from the yarn, leaving the chemical and physical properties of both the yarn and the dyestuffs unaltered. Films composed of cellulose acetate and similarly dyed may be treated in the same way with similar results.

As stated above, it is preferable to employ a temperature of from about 54° to 72° C. in this treatment. If the yarn is treated for three ten minute periods with trichlorethylene alone, it will be found that an appreciable amount of the dyestuff will remain and if it is desired to remove this, a further treatment will be necessary.

However, if a small amount, preferably about 2% of acetone is added to the trichlorethylene, three ten minute treatments with this solution under the same temperature conditions as stated above will entirely remove the dyestuffs from the yarn without any change in the physical or chemical characteristics of either the yarn or the dyestuffs.

There may also be added to the solution of trichlorethylene or acetone, a small amount of benzene or similar substance. This appears to facilitate somewhat the operation.

The dichlorethylene may be used in the cold for the extraction of the dyestuffs, but it is such a powerful swelling agent that it tends to affect the luster and physical properties of the yarn, films, etc., unless the process is very carefully carried out.

As indicated above, by the use of trichlorethylene the dyes may be extracted, leaving the physical and chemical properties of the cellulosic material substantially unchanged. There may be some slight change in the characteristics of the dyestuffs due to the following fact. These chlorine derivatives are subject to very gradual hydrolysis, especially when heated in the presence of moisture. The free acids developed by this hydrolysis will combine with any basic dyestuffs with which they are brought into contact. Since this hydrolysis is very gradual, the ensuing change in the dyestuffs will be exceedingly slight. In any event it may be noted that the recovery of the dyestuffs is of less importance than the recovery of the fibres, films, and the like. There may be removed at the same time with the dyestuffs, oil, sizes, or other finishes which have been applied to the materials under treatment and this may necessitate certain purification before the dyestuffs are again used.

While the process is particularly adapted to materials which have been dyed with S. R. A. dyestuffs and S. R. A. methods, it is also applicable to materials which have been dyed with other dyestuffs, particularly those which are applied to the yarn from a colloidal dispersion. Examples of such dyestuffs are:

Yellow_____Amino azo benzene
Orange_____Para nitro benzene azo dimethylaniline
Blue_____Methyl amino anthraquinone
Red_____1 oxy 4 amino anthraquinone or benzene azo benzene azo monomethylaniline, etc.

Furthermore, the temperature conditions may vary since the highest temperature is the boiling point of the extracting medium and the lowest varies with the medium employed. Temperatures of from 28° to 72° C. have been found satisfactory.

It may be noted that the solutions referred to in the claims may be a solution of a single substance or solutions of a mixture of substances. The cellulosic materials may be either yarns, fabrics, films, or the like. It is obvious that the process may be applied to yarns or fabrics consisting solely of artificial cellulose material or to those consisting only in part of such material. In general, it may be stated that the invention is to be regarded as limited only by the scope of the appended claims.

I claim as my invention:

1. A process for the extraction of dyestuffs from dyed artificial cellulosic material which comprises treating said material with a solution which is a swelling agent for the cellulosic material and a solvent for the dyestuffs, and includes a chlorine derivative of an unsaturated aliphatic hydrocarbon.

2. A process for the extraction of dyestuffs from dyed artificial cellulosic material which comprises treating said material with a solution which is a swelling agent for the cellulosic material and a solvent for the dyestuffs, and includes a chlorine derivative of an unsaturated aliphatic hydrocarbon and acetone.

3. A process for the extraction of dyestuffs from dyed artificial cellulosic material which comprises treating said material with a solution which is a swelling agent for the cellulosic material and a solvent for the dyestuffs, and includes trichlorethylene.

4. A process for the extraction of dyestuffs from dyed artificial material formed from organic derivatives of cellulose which comprises treating said material with a solution which is a swelling agent for the cellulosic material and a solvent for the dyestuffs, and includes trichlorethylene and acetone.

5. A process for the extraction of dyestuffs from dyed artificial material formed from organic derivatives of cellulose which comprises treating said material with a solution which is a swelling agent for the cellulosic material and a solvent for the dyestuffs, and includes trichlorethylene and about 2% of acetone.

6. A process for the extraction of dyestuffs from dyed artificial material formed from organic derivatives of cellulose which comprises treating said material with a solution which is a swelling agent for the cellulosic material and a solvent for the dyestuffs, and includes trichlorethylene, the treatment being carried out at from 54 to 72° C.

7. A process for the extraction of dyestuffs from dyed artificial material formed from organic derivatives of cellulose which comprises treating said material with a solution which is a swelling agent for the cellulosic material and a solvent for the dyestuffs, and includes trichlorethylene and acetone, the treatment being carried out at from 54 to 72° C.

8. A process for the extraction of dyestuffs from dyed artificial material formed from organic derivatives of cellulose which comprises treating said material with a solution which is a swelling agent for the cellulosic material and a solvent for the dyestuffs, and includes trichlorethylene, acetone and benzene.

9. A process for the extraction of dyestuffs from dyed artificial material formed from organic derivatives of cellulose which comprises giving said material successive treatments with a solution which is a swelling agent for the cellulosic material and a solvent for the dyestuffs, and includes trichlorethylene.

10. A process for the extraction of dyestuffs from dyed artificial material formed from organic derivatives of cellulose which comprises giving said material successive treatments at gradually increasing temperatures with a solution which is a swelling agent for the cellulosic material and a solvent for the dyestuffs, and includes trichlorethylene and acetone.

11. A process for the extraction of dyestuffs from dyed material formed from cellulose acetate, which comprises treating said material with a solution which is a swelling agent for the cellulose acetate and a solvent for the dyestuffs, and includes a chlorine derivative of an unsaturated aliphatic hydrocarbon.

12. A process for the extraction of dyestuffs from dyed material formed from cellulose acetate, which comprises treating said material with a solution which is a swelling agent for the cellulose acetate and a solvent for the dyestuffs, and includes trichlorethylene.

13. A process for the extraction of dyestuffs from dyed material formed from cellulose acetate, which comprises treating said material with a solution which is a swelling agent for the cellulose acetate and a solvent for the dyestuffs, and includes trichlorethylene and acetone.

14. A process for the extraction of dyestuffs from dyed material formed from cellulose acetate, which comprises giving said material successive treatments at gradually increasing temperatures with a solution which is a swelling agent for the cellulose acetate and a solvent for the dyestuffs, and includes a chlorine derivative of an unsaturated aliphatic hydrocarbon.

15. A process for the extraction of dyestuffs from dyed material formed from cellulose acetate, which comprises giving said material successive treatments at gradually increasing temperatures with a solution which is a swelling agent for the cellulose acetate and a solvent for the dyestuffs, and includes trichlorethylene.

16. A process for the extraction of dyestuffs from dyed material formed from cellulose acetate, which comprises giving said material successive treatments at gradually increasing temperatures with a solution which is a swelling agent for the cellulose acetate and a solvent for the dyestuffs, and includes trichlorethylene and acetone.

In testimony whereof, I have hereunto subscribed my name.

WILLIAM WHITEHEAD.